455/3

Dec. 23, 1969 L. D. SWEENEY 3,486,135

CATV CABLE TAKEOFF

Filed Aug. 19, 1968 2 Sheets-Sheet 1

INVENTOR
LEWIS D. SWEENEY
BY
Zabel, Baker, York, Jones & Dithmar
ATTYS.

Trunk may feed-thru terms 10-11 or T tap off may feed 10 eliminating 11, 14, 15

INVENTOR
LEWIS D. SWEENEY
BY
Zabel, Baker, York, Jones & Dithmar
ATTYS.

United States Patent Office 3,486,135

Patented Dec. 23, 1969

3,486,135

CATV CABLE TAKEOFF

Lewis D. Sweeney, Melrose Park, Ill., assignor to Reliable Electric Company, Franklin Park, Ill., a corporation of Illinois Filed Aug. 19, 1968, Ser. No. 753,524
Int. Cl. H01p 5/12
U.S. Cl. 333—9 8 Claims

ABSTRACT OF THE DISCLOSURE

A takeoff for connection to a CATV cable makes possible the feeding of signals from the cable to one or more TV receivers. A metallic housing containing all components has one terminal for connection to the inner conductor of a coaxial cable, said one terminal functioning as the takeoff input terminal. This terminal is connected to what is effectively a broad band channel having minimum components going to a distribution junction point. The channel comprises a coupling capacitor and two separate special transformers in series to tap off a desired amount of signal energy from the cable for impressing on the distribution junction point. From the distribution point a number of (as four, for example) equal voltage dividing resistance branches are provided. Each branch has two resistors in series, the junction point between the two resistors constituting a high potential output terminal for connection to a TV receiver.

This invention relates to a CATV cable takeoff for supplying TV channel signals to subscribing TV receivers.

CATV (community antenna TV) systems provide a highly efficient antenna with amplifiers and co-axial cables. Amplifiers are usually provided at or near the antenna proper and at suitable locations as required along co-axial distribution cables. Such amplifiers and other antenna accessories require power, either DC or low frequency AC, for energization. Takeoffs to which field this invention relates, are devices for tapping high frequency TV channel signals from a co-axial cable for application to one or more conventional receivers. The selection of a TV channel is accomplished at the receiver by conventional tuning means from a number of channels supplied from the CATV system.

A CATV cable takeoff must fulfill a number of rigorous conditions. Thus such a takeoff must not interfere with the normal flow of direct current or usual 60 cycle alternating current for energizing the CATV amplifiers. In addition, a takeoff should provide a limited amount of signal energy from a co-axial cable, the amount usually being a function of the distance from the nearest upstream amplifier. By upstream amplifier is meant an amplifier in the cable channel going toward the antenna. An additional and important requirement is that a takeoff should not distort signal energy with respect to phase or reflections. The former comes about because of the introduction into the channel of lumped capacitance or inductance while the latter results from improper channel termination. The takeoff employing the present invention is useful for frequencies ranging from channel 2 to and including channel 13, this comprising a frequency band from about 50 megahertz (mHz.) to about 220 mHz.

Apart from the above identified requirements for a satisfactory takeoff are additional requirements concerned with production in quantity of a technically satisfactory takeoff at a reasonable price, a minimum number of components and minimum technical demands on personnel installing a takeoff in a co-axial cable system and simplicity in connecting or disconnecting a TV receiver to such a takeoff.

Prior takeoffs have generally involved hybrid circuits requiring accurately balanced transformers with careful control over circuit balancing. Such prior takeoffs have required a relatively large number of components each of which had to be wired in properly. Such takeoffs, including the new takeoff, are housed in metal boxes to prevent radiation and to protect against dirt, weather and mechanical damage. As is well known in high frequency devices and is particularly well known in assembling TV receiver chassis, the physical deployment of various components with respect to each other and with respect to the walls of the housing is important. This comes about because every physical metal part in a high frequency system, including leads has electromagnetic and electrostatic fields about it and are reactances, having resistance, capacitance and inductance. It is true that a component may have one of these characteristics to a large degree but the remaining characteristics cannot be neglected at the frequencies considered. Even the length of wire lead and existence of bends and sharp points in leads may have an appreciable influence.

Because of the above considerations, any improvement in a takeoff whereby the number of components required is substantially reduced has cumulative advantages. By reducing the number of components, problems involving wiring and geometrical spacing are simplified. An important characteristics is involved in connection with final test of such a device. A takeoff for TV channel frequencies requires, during final test, a physical adjustment of the geometry of various components and leads. This is to minimize, for the most part, electro-magnetic and electro-static coupling between various elements of the entire takeoff, including components as well as wiring connections. Usually in high frequency devices generally, such things as minute capacitors, minute resistors and leads between various parts are adjusted by bending the leads, the leads being stiff enough to maintain the parts indefinitely in such adjusted positions.

A takeoff employing the present invention has highly desirable characteristics incident to the substantial reduction in the number of components required. A simplification in the physical layout of parts permits easy manipulation of components for adjustment, and insuring maximum operating efficiency.

The invention in general provides what in effect may be considered as a broad band transmission channel connected between the central conductor of a co-axial cable and a distribution junction point and having predetermined attenuation characteristics to apply to such distribution point signals in the desired frequency band being handled (channels 2 to 13 inclusive) at a desired energy level. The desired energy level is high enough for use as a source of signals for TV receivers but is low enough to prevent objectionable drop in the energy level in the main cable system going downstream from the tap off point. The distribution junction point has a number of resistance branches connected between it and ground in shunt to each other. Preferably the resistance branches are similar in value. A resistance branch has a dropping resistor between the distribution junction point and an output terminal for connection to a TV receiver. The branch also has a load resistor between the output terminal and ground. A cable connection to a TV receiver is effected across this last named load resistor.

A load resistor is proportioned to provide a proper match to a cable going to a TV receiver, such as for example a 75 ohm or 300 ohm cable. The cable going to a TV receiver need not necessarily be coaxial and may be of the twin lead variety. While the load resistors in the various branches may be similar, it is possible to have some differences for special cable impedances between an output terminal and the receiver. The total resistance in an entire branch should remain the same. In the absence of a receiver connection, a terminating resistance (in the form of a cap) to substitute for the receiver may be provided across the load resistor so that at all times high frequency energy from the distribution junction point to ground will go along predetermined paths, usually equal in resistance.

The broad band communication channel provided by the new takeoff, extending between the coaxial CATV cable and the distribution junction point within the takeoff, includes a coupling capacitor which has a dual function. As one function, the coupling capacitor is so small in terms of capacitance that the capacitor functions to block completely direct or low frequency voltages in the central conductor of the CATV cable which voltages should not be impressed upon the TV receiver signal input circuit. Thus any direct voltage or low frequency (such as 60 cycles) voltage on the CATV inner conductor will be isolated from any TV receiver because of safety requirements.

As the other function, the coupling capacitor is preferably variable and functions as a variable impedance to control to a substantial degree the energy level of signals from the CATV co-axial cable tapped off for use in TV receivers. By controlling the value of the capacitor, the amount of signal attenuation for takeoff may be adjusted. As a rule, this adjustment is made at the factory and the completed takeoff device will generally be marked on the outside of the housing with a suitable indication, usually in db, of the attenuation or loss in signal level between the input and output of the entire takeoff. As is well known, the desired attenuation for a takeoff is determined by its location and is generally a function of the distance from the output, upstream, of the nearest CATV amplifier. Thus the further downstream from an amplifier a takeoff is located, the lower will be the takeoff attenuation. This is due to the fact that the CATV coaxial cable attenuates a signal as it progresses along the cable.

A takeoff employing the present invention is most conveniently connected into a coaxial cable by severing the inner and outer cable conductors. Each end of the central conductor is connected to terminals within the takeoff housing and each end of the outer conductor is connected to the metallic takeoff housing. However, for all practical purposes, the circuitry of the new takeoff is such that the coaxial cable both upstream and downstream of the takeoff has a continuous uninterrupted transmission channel for both television signals and for power energizing currents in the central conductor. The new takeoff requires one functioning terminal properly connected to the coaxial inner conductor, it being understood that the outer conductor is continuous both upstream and downstream from the takeoff point by virtue of appropriate connections to the housing of the new takeoff. Thus as a practical matter, the new takeoff may, if desired, be connected to the coaxial cable by a coaxial T rather than having the two ends of a severed inner conductor extending into the takeoff housing. The important factor in tapping from a coaxial line with the new takeoff is to have one takeoff terminal connected to the inner conductor of a coaxial cable and the outer conductor connected to the metallic takeoff housing.

The invention will now be disclosed in connection with the drawings wherein.

Figure 1:
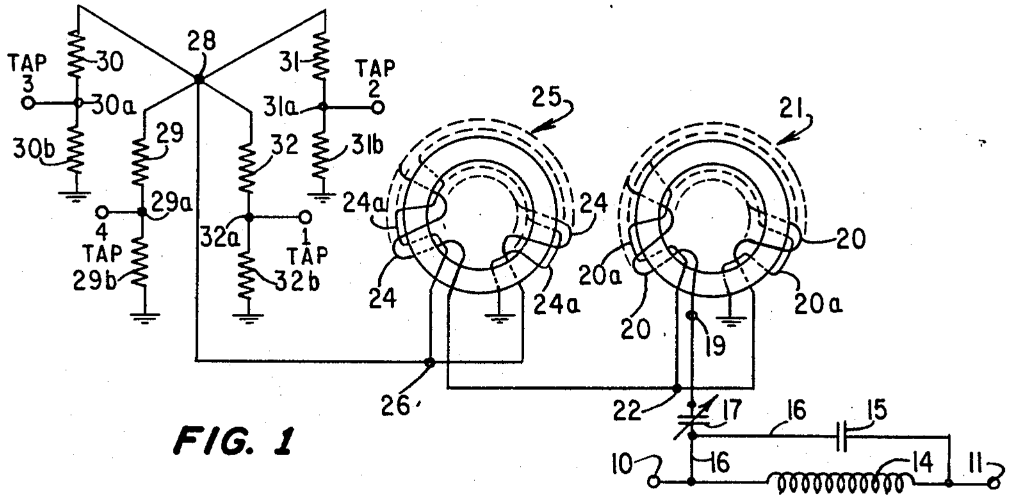
FIGURE 1 is a circuit diagram of the new takeoff for four TV receivers.

Referring first to FIG. 1, terminals 10 and 11 of the take-off are provided for connection to the severed inner conductor ends of a coaxial cable. The outer conductor of such cable is grounded and will be connected to the metallic housing within which the entire takeoff is disposed. As is well known, a coaxial cable consists of a central conductor, which may be a solid or stranded copper wire, supported along the central axis of a tubular outer copper conductor. Between the two is a dielectric, such as air or more usually polyethylene, supporting the two conductors in proper relative position. The impedance of such a coaxial cable is a function of the dielectric constant between the conductors and the radii of the inner and outer conductors.

The tubular outer conductor is generally a copper braid and will have an outer protective layer of plastic. In some instances, particularly high power coaxial cables, an additional outer braid conductor may be disposed over the insulating sheath of the first outer conductor, the two outer conductors being electrically insulated from each other. The function of the secondary outer conductor is to suppress radiation from the central conductor which might pass through the interstices of the first outer conductor. However, for the purposes of this invention, it is immaterial whether the coaxial cable has one or more outer conductors.

It is immaterial to which end of the coaxial central conductor terminal 10 or 11 is connected. The TV signal communication channel provided by a coaxial cable is continuous between terminals 10 and 11. This continuity is provided by inductor or choke 14 shunted by capacitor 15. Choke 14 should have enough inductance to suppress radio and particularly TV channel frequencies. As an example, choke 14 may be made of No. 20 insulated copper wire wound to provide about 15 or 20 turns of an air core helical coil having an axial length of about ⅝ of an inch with the inside diameter of the coil being about ¼ of an inch. There is nothing critical about choke 14 or its dimensions.

Capacitor 15 is any suitable type, such as ceramic and may have a value in the range of from about .0005 mf. to about .02 mf. Preferably capacitor 15 will have a D.C. voltage rating of the order of about 1,000 volts although this value will depend upon various engineering and underwriter considerations. Thus choke 14 provides the through metallic continuity of the central conductor for low frequency or direct current and capacitor 15 provides continuity for TV channel frequencies.

It is immaterial whether terminal 10 is connected to the upstream or downstream end of the coaxial cable. A coaxial T coupling to terminal 10 and the housing for the takeoff may be used for tapping TV signal frequencies, in which case terminal 11 and the connections between these two terminals may be dispensed with. The important thing is to impress the TV signal frequency voltages travelling along the central conductor of the coaxial cable on terminal 10.

Terminal 10 is connected by wire 16 to one terminal of variable coupling capacitor 17. This capacitor preferably has a tuning range in the low micromicrofarad range and as an example may have a tunable range of between about ½ to about 3 mmf. The capacitor may be any one of a number of types available on the market. Capacitor 17 may consist of a ceramic sleeve having internal threading for accommodating a metal screw functioning as one plate and having part of the outer surface of the sleeve metallized, functioning as the other plate. By turning the screw into or out of the ceramic sleeve, the trimming capacitance may be adjusted.

As a rule, desired attenuation characteristics of the entire takeoff may be obtained by appropriate adjustment of trimmer capacitance. The greater the trimmer capacitance the lower the impedance for signal frequencies and the higher will be the level of signal energy to be fed to the remainder of the takeoff.

Capacitor 17 has its other terminal connected to terminal 19 of winding 20 wound in bifilar relation with secondary winding **20*a* to provide toroidal transformer 21. The primary and secondary windings are connected in series aiding (an end of the primary being connected to a beginning of the secondary). Transformer 21** is quite small in physical size and preferably has a powdered ferrite toroid core. As an example, the toroid has a permeability of about 125 plus or minus 25% and has an inside diameter about ⅛ inch. The core thickness is about 1/16 of an inch for this size, although the thickness and outside diameter will depend upon the manufacturer. A ferrite core designated as Stackpole Part No. W9451C may be used. The core size and permeability are not critical and so long as the inductance requirements are met, substantial variation is possible.

The primary and secondary windings are preferably of insulated copper magnet wire and may be No. 28 or No. 30, this being stiff enough so that the leads can function as transformer supports. While the number of winding turns may range from about 5 to as much as about 18, about 10 or 12 turns generally provide satisfactory results. Secondary winding **20*a* is connected between ground and junction point 22 on the primary. The primary and secondary windings are so connected that a current of electricity going from terminal 19 of primary winding 20 to junction 22 and thence to secondary winding 20*a* to ground will create aiding magnetic fields. The computed inductance separately of each of the windings of transformer 21, this value being based upon empirical formulation involving the physical dimensions of the turns and permeability of the core is, for the television frequencies considered (channels 2 to 13** inclusive) between about 3 and about 4 microhenries plus or minus 25% with a preferred value of about 3.4 plus or minus 25%. The leads from the transformer windings should be long enough and stiff enough to permit some adjustment in space transformer orientation.

Junction 22 is connected to primary winding 24 of transformer 25 whose secondary winding **24*a* is connected between junction 26 (where the primary and secondary are connected together in series aiding) and ground. While transformer 25 need not necessarily be the same, physically or electrically, as transformer 21, it is preferred to have the two transformers similar in all respects. The mounting of transformers 21 and 25 and the orientation must be such as to minimize electromagnetic and electrostatic coupling between them and between extensive grounded surfaces as will be more fully set forth later. Junction 26 is connected to distribution junction point 28**.

From junction point 28 dropping resistors 29 to 32 inclusive branch off. Resistor 29 has output terminal **29*a* to which is also connected one terminal of grounded load resistor 29*b*. Dropping resistors 30, 31 and 32 each have correspondingly numbered output terminals 30*a*, 31*a* and 32*a* each connected to one terminal of grounded load resistors 30*b*, 31*b* and 32*b* ground and each of the output terminals 29*a* to 32*a* is for connection to the antenna input to a TV receiver. The number of branches from junction point 28** need not necessarily be four as illustrated.

The reactances in the takeoff system between terminal 10 and junction point 28 should be sufficient to limit signal energy tapped from the CATV cable to a desirable level, while providing adequate signal voltages at junction point 28. The resistance to ground of junction point 28 preferably should remain about the same whether a TV receiver is connected to any takeoff output terminal or not. By proper selection of resistor values, within a rather wide range, satisfactory matching of a voltage divider network output and a TV receiver input may be provided. For TV frequencies corresponding to channels 2 to 13 inclusive, each resistor in a voltage divider may range from about 50 ohms to about 400 ohms. It is not necessary that all resistance branches in a takeoff be the same. Thus a branch may have a total resistance between about 100 and about 800 ohms. If the number of branches is different from four, then the branch resistance range will be different to keep the total of resistances in shunt at desired level.

Four TV receivers per takeoff are convenient. However, a takeoff may have a greater, or smaller number of receiver connections. The ratio of resistor values for a voltage divider in a branch will depend upon the impedance faced when a TV receiver is connected for operation. The range of resistance possibilities with the new takeoff makes it possible to provide a proper match for any TV receiver input impedance.

As an example, a takeoff as previously described may have a dropping resistor of about 130 ohms and load resistor of about 180 ohms to accommodate a 75 ohm TV receiver input impedance. Resistor tolerances are preferably about 5% and rating may be about ⅛ watt.

In making a physical embodiment of the takeoff diagrammatically illustrated and described, it is important to provide a compact arrangement of all parts to permit short leads and provide low resistance grounds. The system so far described lends itself admirably to a compact and efficient arrangement.

A physical embodiment of a takeoff within a metallic housing is illustrated in the drawings and will now be described as an exemplary showing of such construction. It is understood that within limits necessitated by accepted engineering practice in wiring components in high frequency circuits, different physical arrangements of such components are possible without departing from the invention. Corresponding circuit components in the diagram illustrated in FIG. 1 of the drawing and the remaining figures of the drawing illustrating structure carry similar numerals.

Except for coaxial feedthroughs rigidly supported in the housing used to provide a coaxial cable connection to TV receivers, all takeoff components are firmly supported on stiff insulating panel 40 of suitable material such as, Bakelite, rubber, or other plastic. Panel 40 may have a thickness of the order of about one-sixteenth of an inch and has top face **40*a* and rear face 40*b*. Top face 40*a* has the various circuit components mounted thereover. With the exception of trimmer capacitor 17 and terminals 10 and 11, the remaining components are supported on or above top face 40*a* by their leads, such leads extending through apertures in panel 40 to rear panel face 40*b***.

Terminals 10 and 11 are, relative to the remaining components, quite massive and are preferably staked to panel 40 near end 41 of the panel. Solder joints **10*a* and 11*a* are disposed at the rear face 40*b* of the panel to connect terminals 10 and 11 and leads extending therefrom. In a practical embodiment of a takeoff embodying the present invention, panel 40 may have a width of about 1¾ inches as measured along edge 41 and a length of about 2⅝ inches along side 42**. These dimensions are exemplary and illustrate the compactness of the entire takeoff made possible by the substantial reduction in the number of components as compared to prior takeoff devices.

Adjacent physical terminals 10 and 11 is choke 14 with the axis of the coil parallel generally to the plane of panel 40. The terminals of choke 14 extend through suitable apertures in board 40 and are anchored at soldered joints **10*a* and 11*a***.

Figure 7:
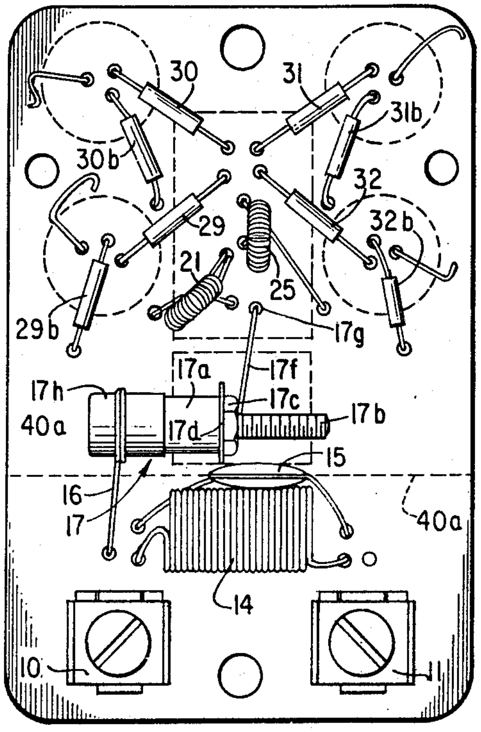
FIGURE 7 is an enlarged plan view of the top panel face showing the components.
Figure 5:
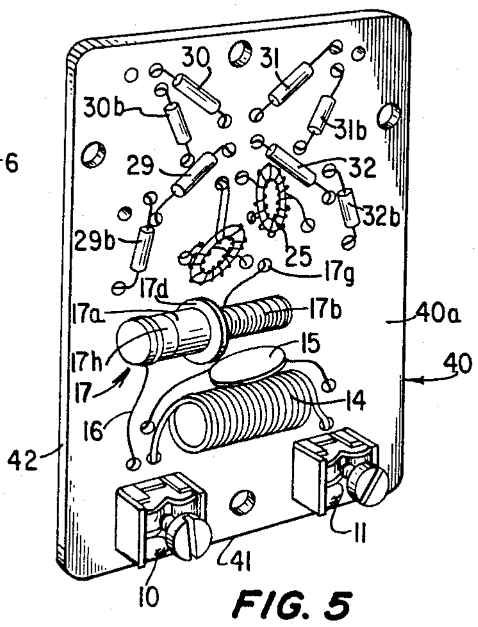
FIGURE 5 is a perspective view of the top face of a panel illustrating the placement of various components.
Figure 3:
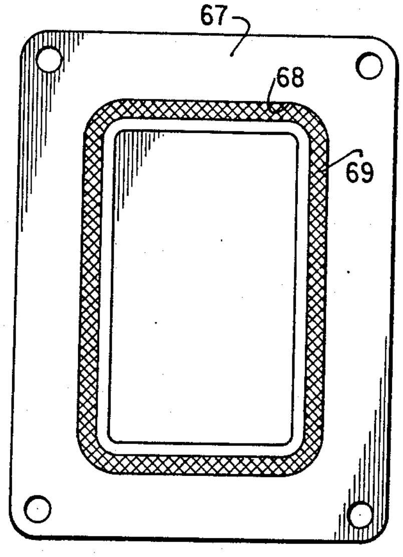
FIGURE 3 shows the inside face of the housing cover.

Bypass capacitor 15 is in the form of a relatively thin wafer lying adjacent choke 14, having its leads pass through apertures in board 40 for anchorage in joints **10*a* and 11*a***. Such wafer shaped capacitors are widely used in TV receiver circuits and in this instance, the wafer which may have a diameter of about ⅜ of an inch can be positioned as illustrated in FIGS. 5 and 7.

As has been previously indicated, choke 14 and capacitor 15 are provided to insure electrical continuity within the housing of the takeoff for the coaxial cable. In the event that a T coaxial fixture is used, only terminal 10 would be necessary and choke 14 and capacitor 15 could be omitted or would be non-functioning. The arrangement of terminals 10 and 11, choke 14 and bypass capacitor 15 at one end of panel 40 is convenient and removes these components from having any substantial electrostatic or electromagnetic effects on the remaining takeoff components except for direct metallic connections thereto.

Trimmer capacitor 17 comprises ceramic sleeve 17*a* whose bore is threaded to accommodate metallic screw 17*b* locked in desired adjusted position by nut 17*c* and lock washer 17*d*. Lock washer 17*d* has lug 17*e* passing through an aperture in panel 40 to which a mass of solder is attached for firmly anchoring the trimmer capacitor to panel 40. Wire lead 17*f* soldered to lock washer 17*d* lies above the surface of face 40*a* and passes through aperture 17*g* in panel 40 to terminate in a small mass of solder comprising junction 19 on rear face 40*b*. Trimmer capacitor 17 has metallized layer 17*h* about which is wound lead 16 coming from terminal 10. Lead 16 is soldered to metallized layer 17*h* and most of it lies adjacent panel face 40*a*. The trimmer capacitor is so supported that the body of sleeve 17*a* and particularly metallized surface 17*h* clears face 40*a* to reduce capacitance to ground of extended surface 40*c* (see FIG. 4).

Figure 4:
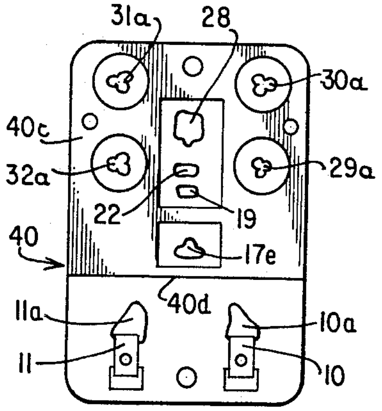
FIGURE 4 shows the bottom or rear face of the panel carrying components, the shading indicating the metallized grounding surface over part of the panel face.

Ground surface 40*c* may be considered as a printed circuit component and preferably consists of a thin layer of solder firmly bonded to rear face 40*b* of panel 40. Ground surface 40*c* has edge 40*d* which is parallel to edge 41 of board 40 and laterally offset therefrom so that terminals 10 and 11 and choke 14 and bypass capacitor 15 are clear. Ground surface 40*c* otherwise covers all of rear face 40*b* of panel 40 as illustrated in FIG. 4 except for some clear islands surrounding junctions 19, 22, 28, 29*a* to 32*a* inclusive, and soldered portions 17*e* of trimmer capacitor 17. All of the islands have metal at potential above ground. The dimensions of these various islands and shapes may vary and the objective is to provide some spacing along the surface of rear face 40*b* between metal parts of the circuit at different potentials. On the other hand, a ground should not have any parts thereof at different potentials. Accordingly, the islands may conveniently have the shapes as illustrated for providing adequate insulation while still providing desirable extensive ground surface.

It is because of the proximity of some of the wires and components to ground surface 40*c* that components and leads which are above ground potential for high frequencies are mounted to clear face 40*c*. In addition, bends in lead wires need not be so sharp, which is also desirable.

Toroidal transformers 21 and 25 are positioned so that the toroids generally stand over the rectangular island containing junctions 19, 22 and 28. These transformers are supported by their leads so that the cores stand up from face 40*a* of panel 40 as illustrated in the drawing. The transformer cores are so oriented with respect to each other to provide minimum coupling therebetween. This final position is determined by testing a takeoff in its housing as if in actual use. Similar results may also be obtained by having the cores spaced higher from panel 40. It is preferred to have the transformers close to panel 40 for mechanical reasons. In this particular array of parts, the positions of the two transformer cores happen to be as illustrated in FIG. 7. Excepting for adjustment of trimmer capacitor 17, and the positions of the two transformers, the remaining parts require little, if any, adjustment to provide desired characteristics.

Panel 40 is rigidly supported in metal housing 50. Housing 50 has bottom wall 51 and sidewalls 52 to 55 inclusive. Bottom wall 51 has support shoulder 56 adjacent sidewall 52 and support ledge 57 extending along part of sidewall 53, all of sidewall 54 and part of sidewall 55. Support shoulder 56 and ledge 57 have support surfaces lying substantially in one plane upon which panel 40 may rest with rear face 40*b* facing housing bottom 51. The plane for supporting panel 40 is elevated above housing bottom 51 enough to reduce electrostatic effects of bottom 51 on the components and soldered parts carried by panel 40. Panel support positions of housing 50 are provided with tapped recesses for engaging bolts 57 and 58 which pass through apertures in panel 40 for securely anchoring panel 40 within the housing. Excepting for shoulder portion 56 which engages the clear end portion of panel 40 between terminals 10 and 11, the remaining apertures through panel 40 pass through panel 40 and ground surface 40*c* and function to provide excellent electrical contact to housing 50. In addition, the rigidity of panel 40, together with the stiffness of the various wire leads supporting the components make for a sturdy construction.

Figure 2:
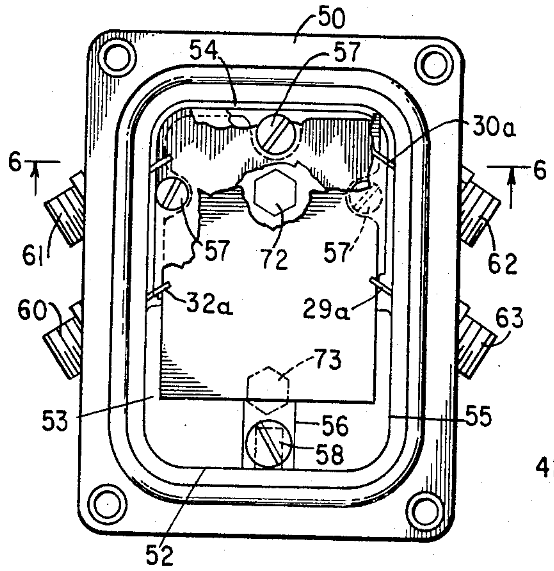
FIGURE 2 is a plan view of the housing with takeoff installed but with cover removed.

Sidewalls 53 and 55 of the housing are provided with tapped passageways therethrough, preferably inclined to the wall surface for accommodating coaxial feedthroughs 60, 61, 62 and 63. These feedthroughs are available on the market and consist of a metallic sleeve suitably threaded on the exterior surface and having a plastic body within the sleeve supporting a short length of conductor to make a coaxial cable extension. The feedthroughs are threaded into the housing as illustrated in FIG. 2 and appropriate leads from panel 40 are soldered thereto. Output terminals 29*a* to 32*a* inclusive are thus connected at the proper terminals of the resistors for providing a readily detachable coaxial cable coupling to the takeoff. In the absence of a cable coupling to a TV receiver, it is customary to provide threaded caps to cover the outer ends of the feedthroughs and at the same time a desired resistance as a dummy load may be provided.

After such feedthroughs are positioned in place, leads from appropriate resistors are soldered to the appropriate terminals of the feedthroughs, these terminals constituting the output terminals for the takeoff.

A stiff paper shroud 65 is disposed within housing 50 to cover the various components on insulating board 40. Shroud 65 is anchored in place by bolt 58 and provides protection against damage to components during installation in a CATV system.

Figure 6:
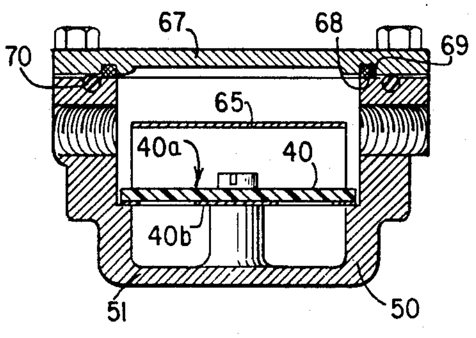
FIGURE 6 is a section on line 6—6 of FIGURE 2.

Housing 50 preferably has rounded corners and is provided with metal cover 67 bolted at the corners of the housing to the housing proper. Cover 67 preferably has trough 68 accommodating a length of metallic braid for establishing excellent electrical contact between the cover and housing as well as providing a shield against radiation. Braid 69 may be a length of tubular braid usually disposed around wires for shielding. Housing 50 has trough 70 extending the length of the top of the sidewalls of housing 50 to accommodate a rubber gasket for providing waterproofing. Preferably the braid and gasket rubber are laterally offset from each other as shown in FIG. 6. The feedthroughs extending through the sidewalls of the housing are usually waterproof so that when the device is completely sealed, protection against ingress of water or dirt and protection against emission of high frequency radiant energy from within the housing is provided. The entire takeoff with housing is mounted by bolts 72 and 73 extending through bottom 50 of the housing. Care must be exercised to insure that these bolts are tight in the bottom wall both for waterproofing and to prevent radiation.

The order in which capacitor 17 and transformers 21 and 25 are connected between terminal 10 and distribution junction point 28 may be varied to change attenuation characteristics. The polarity of connections of transformers 21 and 25 may also be changed so long as each transformer has its primary and secondary winding in series aiding relation. Such a change may affect transmission characteristics.

The circuit arrangement of FIGURE 1 is preferred, however, for practical technical considerations. Capacitor 17 is physically larger and its location near terminal 10 and over a clear area of panel 40 reduces effects of capacitance to ground. The transformers may be small and the circuitry permits connections with leads of short length and at the same time accommodates an extensive ground plane. Consequently when a takeoff is wired on panel 40, it may be disposed in a metal housing, tightly closed and thereafter tested. The testing is accomplished by feeding a known TV channel signal at a known signal level and measuring the attenuation at an output point, as point 29*a* for example. It is understood that signal levels are referred to ground. This testing is accomplished for various desired channels. Initially various lead and transformer positions and trimmer capacitor setting are made from empirical information. Then such a takeoff, after testing, may have some adjustments made to endow the takeoff, in its housing, with desired characteristics.

Obviously the greater the number of components in such a device, the more numerous and difficult will be test adjustments. If takeoff components are all spaced generously from each other, resulting in a larger unit, then assembly and adjustments may be simplified.

The takeoff disclosed here provides isolation between TV receivers connected thereto and provides isolation of TV receivers from undesired voltages in the CATV system.

What is claimed is:

1. A takeoff for use in a CATV system handling TV channels in the range of 50 to 240 megahertz inclusive comprising a metal housing for metallic connection to the outer conductor of a coaxial cable, an insulating panel within said housing, a terminal carried by said panel for connection to the inner coaxial conductor, a distribution junction point supported on said panel, a capacitor, two transformers each having a primary and secondary winding wound on a toroidal core in bifilar relation and having said primary and secondary connected in series aiding relation; a ground connection for each secondary free terminal, wiring connecting said capacitor and said two transformer primaries in series between said terminal and said distribution junction point, a plurality of resistance branches in shunt connected between said distribution junction point and ground, the total resistance in a branch ranging from about 100 ohms to about 800 ohms for four branches, an output terminal on each branch for connecting a TV receiver across the part of said resistance branch between said output terminal and ground, said transformers being oriented for substantially minimum coupling therebetween, said capacitor and transformers being proportioned to aid in providing predetermined attenuation between said terminal and distribution junction point for TV channel signals tapped from the coaxial cable, said takeoff being characterized by a small number of components whose physical deployment on said insulating panel simplifies interconnection of components and adjustment of relative spatial positions between components and large grounded metallic surfaces for obtaining desirable attenuation, said component individual electrical characteristics and physical deployment on the panel and within the metallic housing all contributing to affect takeoff operation.

2. The construction according to claim 1 wherein said transformers are electrically adjacent in the series arrangement and said capacitor is at the end of the series arrangement of components.

3. The construction according to claim 2 wherein said capacitor is connected between said terminal and one end of a transformer primary.

4. The construction according to claim 3 wherein said capacitor is variable in a range whose top value is less than 5 micromicrofarads and each transformer winding has an individual computed inductance less than 5 microhenries.

5. The construction according to claim 4 wherein said capacitor has a top value of the order of about 3 micromicrofarads and wherein each transformer winding computed inductance is in the general order of about 3.5 microhenries.

6. The construction according to any one of the preceding claims wherein an additional terminal is provided and wherein a choke is connected between the first and additional terminals, a by-pass capacitor connected across said choke, the severed ends of a coaxial inner conductor being adapted to be connected to said first and additional terminal, said choke having sufficient current carrying ability to pass currents in the ampere range normally carried by such inner conductor and having sufficient inductance to suppress currents at frequencies well aboue 60 Hz., said by-pass capacitor being large enough to bypass TV channel frequencies present in said coaxial cable.

7. The construction according to any one of claims 3, 4, or 5 wherein said panel has all components mounted on one side of said panel, said panel having a substantial part of its other side covered with a metallic grounding layer, said grounding layer being absent from panel areas opposite where the first terminal, capacitor and transformers are located to minimize ground capacitance effects.

8. The construction according to claim 5 wherein an additional terminal is provided, said first and additional terminal being mounted at one end of said panel, a high frequency choke connected across said terminals of sufficiently heavy wire to carry several amperes, a high frequency bypass capacitor shunted across said choke, said capacitor and choke being adjacent said panel end, the panel having a metallized grounding surface over a part of one side of said panel, the remainder of said panel side being the end portion carrying the terminals, choke and bypass capacitor, said metallized panel surface having islands clear of metallizing for accommodating lead wire junctions between the variable capacitor and transformers and resistors at potentials different than ground, and means for supporting said panel in said metal housing so that the metallized grounding surface rests on housing metal for grounding, with the panel supported components spaced from large grounded metal surfaces to minimize ground capacitance.

References Cited

UNITED STATES PATENTS 2,145,548 1/1939 Landon ............... 333—8

HERMAN K. SAALBACH, Primary Examiner

U.S. Cl. X.R.

333—33

PO-1050
(5/69)

UNITED STATES PATENT OFFICE
CERTIFICATE OF CORRECTION

Patent No. 3,486,135 Dated December 23, 1969

Inventor(s) Lewis D. Sweeney

It is certified that error appears in the above-identified patent and that said Letters Patent are hereby corrected as shown below:

Claim 4, line 25, change "aboue" to --above--.

Claim 8, line 43, before "panel", second occurrence, insert --one--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents